United States Patent Office 3,362,953
Patented Jan. 9, 1968

3,362,953
METHINE DYESTUFFS
Alfred Brack, Leverkusen, Germany, assignor to Farbenfabriken Bayer Aktiengesellschaft, Leverkusen, Germany, a corporation of Germany
No Drawing. Filed May 8, 1964, Ser. No. 366,176
Claims priority, application Germany, May 11, 1963,
F 39,709
18 Claims. (Cl. 260—240)

ABSTRACT OF THE DISCLOSURE

Methine dyestuffs free of sulphonic and carboxylic acid groups of the following formula:

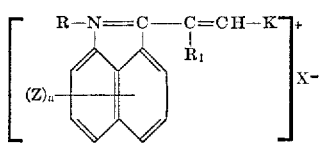

wherein K has the formula:

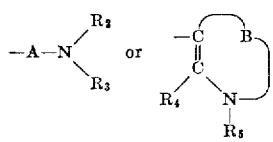

R is lower alkyl, cycloalkyl, aryl, or aralkyl; $R_1$ and $R_5$ are hydrogen, lower alkyl, cycloalkyl, aryl, or aralkyl; $R_2$ and $R_3$ are hydrogen, lower alkyl, cycloalkyl, aryl, aralkyl, or alkylene when joined to each other or to A to form a heterocyclic N-containing ring of 5–6 members; and $R_4$ is hydrogen, lower alkyl, lower alkoxy, cycloalkyl, aryl, aralkyl, carbo lower alkoxy, or carbonamido; A is a carbocyclic or heterocyclic aromatic ring, B is the residue of a 5- or 6-membered heterocyclic ring, Z is hydrogen or a nonionic substituent, $n$ is 1 or 2, and X an anion used in the salt formation of basic dyestuffs.

The present invention relates to novel methine dyestuffs; more particularly it relates to methine dyestuffs of the formula

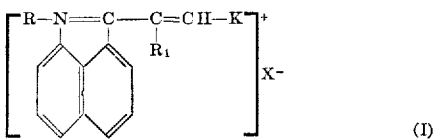

The dyestuffs are free of sulphonic acid and carboxylic acid groups. In the Formula I, R means an alkyl, cycloalkyl, aralkyl or aryl radical, $R_1$ a hydrogen atom, an alkyl, aralkyl, cycloalkyl or aryl radical or a nitrile group, $X^-$ and anion and K the grouping

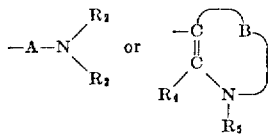

wherein $R_2$ stands for a hydrogen atom, an alkyl, cycloalkyl, aralkyl or aryl radical, $R_3$ for a hydrogen atom, an alkyl, cycloalkyl, aralkyl or aryl radical, $R_4$ for the hydrogen atom, an alkyl, cycloakyl, aralkyl or aryl radical or for an alkoxy, carboxylic acid ester or carboxylic acid amide group, $R_5$ for a hydrogen atom, an alkyl, cycloalkyl, aralkyl or aryl radical, A for a carbocyclic or heterocyclic ring of aromatic character, and B for the complementary members of a heterocyclic 5- or 6-membered ring, and wherein $R_2$ may be linked with $R_3$ or A, with formation of a heterocyclic ring.

The naphthalene rings and/or R, $R_1$, $R_2$, $R_3$, $R_4$, $R_5$ A and/or B may further contain non-ionic substituents.

The dyestuffs of Formula I are obtained by condensing compounds of the general formula

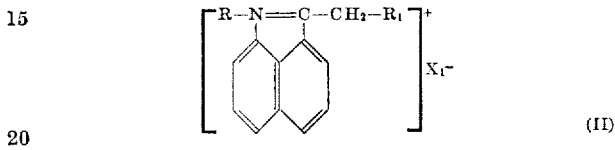

with aldehydes of the general formula

K—CHO    (III)

In the Formulae II and III, R, $R_1$ and K have the meaning explained above and $X_1^-$ is an anion.

The compounds II and III may contain non-ionic substituents. The production of compound II can be carried out according to the instructions of U.S. patent application Ser. No. 356,979, now U.S. Patent 3,299,092, filed Apr. 2, 1964 in the name of Alfred Brack and assigned to the same assignee.

Instead of the aldehydes III, it is also possible to use the functional derivatives thereof, whereby those derivatives of the compounds III are to be understood in which the grouping —CHO is replaced by a functionally equivalent group, for example by the azomethine, acetal or nitrone grouping. The salt-like primary products of Vilmeier's aldehyde synthesis are especially suitable functional derivatives.

A further method for producing the novel dyestuffs consists in condensing aldehydes of the general formula

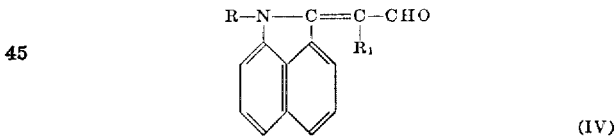

with the compounds K—H, wherein K, R and $R_1$ have the meaning explained above.

In order to carry out the condensation, the components can, for example, be heated in an acid medium to temperatures between 50 and 180° C., preferably from 80 to 130° C. As acid medium, acetic acid, formic acid, propionic acid, chloracetic acid, or mixtures of these acids are suitable, for example. Mixtures of, for example, acetic acid and acetic anhydride or of acetic acid and concentrated hydrochloric acid are also suitable. It is likewise possible to carry out the condensation by treating the components with water-eliminating agents in inert media, such as ethylene chloride, methylene chloride, chloroform, chlorobenzene, dimethyl sulphoxide or toluene. As water-eliminating agents, there are suitable, for example, phosphorus oxychloride, phosphorus pentachloride, phosphorus trichloride and thionyl chloride. When using, instead of the aldehydes of the general Formula III, the functional derivatives thereof, the addition of water-eliminating agents can frequently be dispensed with; under these circumstances, media such as methanol, ethanol, amyl alcohol and dimethyl formamide are also suitable.

Examples of suitable compounds of Formula II are specified in the following table:

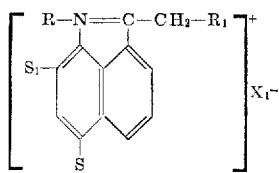

| R | R₁ | S | S₁ | X₁ |
|---|---|---|---|---|
| Methyl | Hydrogen | Hydrogen | Hydrogen | Chloride |
| Methyl | Hydrogen | Chloride | Hydrogen | Chloride |
| Ethyl | Phenyl | Hydrogen | Hydrogen | Chloride |
| Ethyl | Cyano | Hydrogen | Hydrogen | Bromide |
| n-Butyl | Methyl | Hydrogen | Hydrogen | Iodide |
| i-Amyl | Hydrogen | Bromide | Hydrogen | Bromide |
| Benzyl | Hydrogen | Hydrogen | Hydrogen | Chloride |
| Cyclohexyl | Cyano | Hydrogen | Hydrogen | Bromide |
| Phenyl | Hydrogen | Hydrogen | Hydrogen | Chloride |
| Phenyl | 4'-methyl phenyl | Hydrogen | Hydrogen | Iodide |
| 1-naphthyl | Hydrogen | Hydrogen | Hydrogen | Chloride |

Suitable aldehydes of Formula III are, for example, 4-amino-benzaldehyde, 4-N-methyl-amino-benzaldehyde,
4-N,N-dimethylamino-benzaldehyde, 4-N,N-diethyl-amino-benzaldehyde,
4-N,N-diethylamino-3-ethoxy-benzaldehyde, 4-N,N-diethylamino-3,6-diethoxy-benzaldehyde,
4-(N-n-butyl-N-2'-chlorethyl)-amino-benzaldehyde,
4-(N-ethyl-N-2'chlorethyl)-amino-2-methyl-benzaldehyde,
4-dimethylamino-2-chloro-benzaldehyde, 4-(N-methyl-N-2'-cyanoethyl)amino-benzaldehyde,
4-(N-ethyl-N-2'-carbonamido-ethyl)-amino-benzaldehyde, N-(4-formyl-phenyl)-piperindine, N-(4-formyl-phenyl)-morpholine,
4-(N-i-butyl-N-2'hydroxyethyl)-amino-benzaldehyde,
4-(N-ethyl-N-benzyl)-amino-benzaldehyde, 4-N,N-dibenzylamino-benzaldehyde,
4-(N-cyclo-hexyl-N-methyl)-amino-benzaldehyde,
4-(N-phenyl-N-methyl)-amino-benzaldehyde, 4-(N-4'-ethoxyphenyl-N-methyl)-amino-benzaldehyde,
4-(N-4'dimethylamino-phenyl-N-methyl)-amino-benzaldehyde,
4-(N-4'-chlorophenyl-N-methyl)-amino-benzaldehyde,
4-(N-4'-ethoxyphenyl-N-methyl)-amino-2-ethoxy-benzaldehyde,
4-amino-2-methyl-benzaldehyde, 4-amino-2-methoxy-benzaldehyde,
4-amino-3,5-di-isopropyl-benzaldehyde, 4-(N-n-propyl-amino)-3-isopropyl-benzaldehyde,
4-(N-2'ethyl-phenyl)-amino-3-ethyl-benzaldehyde,
4-N,N-dimethylamino-1-naphthaldehyde, 2-(N,N-dimethyl)-amino-thiazole-5-aldehyde,
2-(N-phenyl-N-methyl)-amino-thiazole-5-aldehyde,
2-(N-phenyl-N-methyl)-amino-4-phenyl-thiazole-5-aldehyde,
1-phenyl-3-methyl-5-(N-phenyl-N-methyl)-amino-pyrazole-4-aldehyde,
1-methyl-indole-3-aldehyde, 1-2-dimethyl-indole-3-aldehyde,
2-methyl-indole-3-aldehyde, 2-phenyl-indole-3-aldehyde,
1-methyl-2-phenyl-indole-3-aldehyde, 2-phenyl-7-ethyl-indole-3-aldehyde,
1-methyl-2-phenyl-7-ethyl-indole-3-aldehyde,
1-methyl-2-phenyl-5-methoxy-indole-3-aldehyde,
1,2-dimethyl-5,6-benzindole-3-aldehyde, 1-methyl-pyrrole-2-aldehyde,
1-phenyl-2,5-dimethyl-pyrrole-3-aldehyde, 1-(2'-cyano-ethyl)-2,5-dimethyl-pyrrole-3-aldehyde,
1-(4'-ethoxyphenyl)-2,5-diphenyl-pyrrole-3-aldehyde,
1-phenyl-3-methyl-pyrazole-4-aldehyde, 1-phenyl-3-methyl-5-chloro-pyrazole-4-aldehyde,
9-methyl-carbazole-3-aldehyde, 10-methyl-pheno-thiazine-2-aldehyde and 1-ethyl-1,2,3,4-tetrahydro-quinoline-6-aldehyde.

Suitable compounds of Formula IV are, for example, the aldehydes obtainable by application of Vilsmeier's reaction to the compounds II compiled in the above table. Suitable compounds of the formula K—H are, for example, the carbonyl group-free compounds which underlie the aldehydes of the formula K—HCO enumerated above.

The type of the anion X usual in basic dyestuffs does not affect the dyeing properties of the novel dyestuffs. From their preparation the dyestuffs will normally exhibit anions like halide anions, in particular Cl⁻ and/or Br⁻, or sulfonate groups, such as —OSO₃CH₃⁻ or —OSO₃C₂H₅⁻ or p-toluene sulfonate; in general, the nature of the anion depends on the mode of production, purification and/or precipitation of the dyestuff. The anion can, however, be replaced by other anions normally encountered in dyestuff salts of basic dyestuffs by methods known as such; for this purpose the dyestuff salt is first converted into the free base by neutralizing it with a basic reagent, such as sodium carbonate, sodium hydroxide and the like, and when this base is then converted into the form of the desired salt with the corresponding organic or inorganic acid by means of this procedure, it is possible to obtain dyestuff salts which contain, for example, [BF₄]⁻, benzene sulfonate, phosphate, acetate, chloro zincate, perchlorate, NO₂⁻, sulfate, oxalate, formate, citrate, maleinate, tartrate, benzoate, lactate, propionate, butyrate or succinate radicals as the anions.

The new dyestuffs are suited for the dyeing, printing and colouring in the mass of materials which consist completely or preponderantly of cellulose esters, polyacrylonitrile and/or polyvinylidene cyanide. They can furthermore serve for the dyeing of paper, coco materials and jute, for the preparation of writing liquids and ball point pen pastes and can be employed in rubber printing. The dyeings and prints on polymers and copolymers of polyacrylonitrile are distinguished by their brilliance and good fastness properties, particularly fastness to light, to wet processing, to decatising and to sublimation. Especially the high colouring strength is to be emphasised, as well as the complete and uniform affinity of the novel dyestuffs and their property of leaving wool undyed.

In the following examples, which are given for the purpose of illustrating the invention, the parts are parts by weight, the degrees indicated are degrees centigrade.

*Example 1*

21.7 parts of the compound

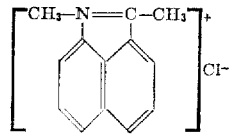

and 14.9 parts of 4-dimethylamino-benzaldehyde are heated with 200 parts of glacial acetic acid and 50 parts of acetic anhydride for 3 hours at 100–105°. After cooling, the dyestuff solution obtained is poured into 1000–2000 parts of water. The dyestuff of the formula

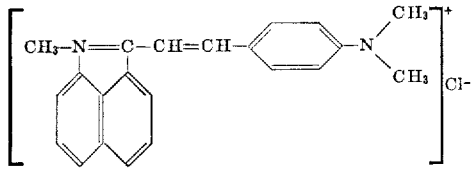

is precipitated by addition of sodium chloride. It dyes acetate rayon and polyacrylonitrile greenish-blue with good fastness properties.

If instead of 4-dimethylamino-benzaldehyde the equivalent amount of one of the following aldehydes is used and the same working method applied valuable reddish blue to bluish green dyestuffs are obtained which possess similar colouristic properties:

4-diethylamino-benzaldehyde
N-(4-formyl-phenyl)-piperidine
4-N-methyl-N-2'-chloroethyl-amino-benzaldehyde
N-(4-formyl-phenyl)-morpholine
N-methyl-tetrahydro(1.2.3.4)-quinoline-6-aldehyde
4-N-methyl-N-2'-chloroethyl-amino-benzaldehyde
4-N-ethyl-N-2'-chloroethyl-amino-benzaldehyde
4-N-n-butyl-N-2'-chloroethyl-aminobenzaldehyde
4-N-ethyl-N-2'-cyanoethyl-amino-benzaldehyde
2-methyl-4-dimethylamino-benzaldehyde
2-methoxy-4-dimethylamino-benzaldehyde
3-methy-4-dimethylamino-benzaldehyde
2-chloro-4-dimethylamino-benzaldehyde
2-ethoxy-4-diethylamino-benzaldehyde
2 - methyl-4-(N-ethyl-N-2'-chloroethyl)-amino-benzaldehyde
2 - methyl-4-(N-ethyl-N-2'-cyanoethyl)-amino-benzaldehyde
3-isopropyl-4-(N-n-propyl)-amino-benzaldehyde
3,5-diisopropyl-4-amino-benzaldehyde
3-ethyl-4-(N-2'-ethyl-phenyl)-amino-benzaldehyde
4-(N-methyl-N-phenyl)-amino-benzaldehyde
4-(N-ethyl-N-phenyl)-amino-benzaldehyde
4-(N-methyl-N-4'-ethoxyphenyl)-amino-benzaldehyde
2 - ethoxy-4-(N-methyl-N-4'-ethoxyphenyl)-amino-benzaldehyde
4-(N-methyl-N-4'-methylphenyl)-amino-benzaldehyde

*Example 2*

31 parts of the compound

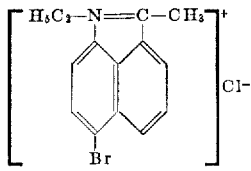

and 23 parts of 2 - methyl-4-(N-ethyl-N-2'-chloroethyl)-aminobenzaldehyde are stirred with 600 parts of chloroform and heated. 20 parts of phosphorus oxychloride are added dropwise to the gently boiling mixture, the mixture is maintained boiling for a further 20–30 minutes and the chloroform is then distilled off. The remaining dyestuff of the formula

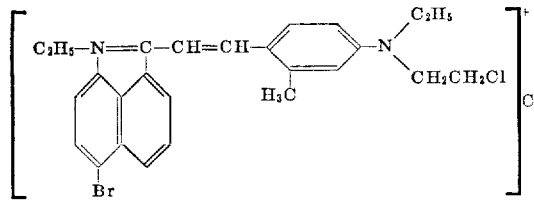

can be purified by recrystallising from water and dyes polyacrylonitrile bluish-green with very good fastness properties.

If instead of 2 - methyl - 4-(N-ethyl-N-2'-chlorethyl)-amino-benzaldehyde the equivalent amount of one of the following aldehydes is used and the same working method applied technically valuable reddish blue to bluish green dyestuffs are obtained which exhibit similar colouristic properties:

4-diethylamino-benzaldehyde
2-methyl-4-diethylamino-benzaldehyde
2-methoxy-4-diethylamino-benzaldehyde
2-ethoxy-4-diethylamino-benzaldehyde
1,2-dimethyl-indole-(3)-aldehyde
2-methyl-indole-(3)-aldehyde
1-methyl-2-phenyl-indole-(3)-aldehyde
1-methyl-2-phenyl-7-ethyl-indole-(3)-aldehyde
1-ethyl-2-phenyl-indole-(3)-aldehyde
1-methyl-2-phenyl-5-methoxyindole-(3)-aldehyde
1,2-dimethyl-5-chloro-indole-(3)-aldehyde
2-methyl-7-ethyl-indole-(3)-aldehyde

*Example 3*

22 parts of the compound

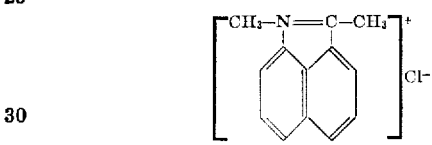

and 23.5 parts of 1-methyl-2-phenyl-indole-(3)-aldehyde are heated with 100 parts of glacial acetic acid and 40 parts of acetic anhydride for 3–4 hours at 100 to 110°. After cooling, the deep-blue mass formed is diluted with 1000 to 2000 parts of water and the dyestuff of the formula

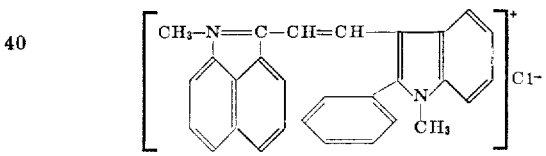

is precipitated by addition of sodium chloride or a solution of sodium chloride. The dyestuff dyes polyacrylonitrile, polycinylidene cyanide and acetate rayon reddish-blue with very good fastness properties. If, instead of 1-methyl - 2 - phenyl - indole - (3) - aldehyde, the equivalent quantity of 2-phenyl-7-ethyl-indole-(3)-aldehyde is used, the dyestuff of the formula

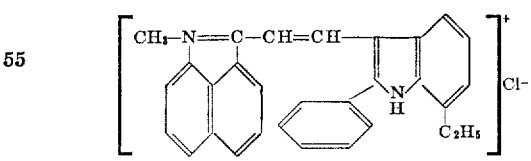

is obtained, which dyes the materials mentioned above blue with excellent fastness properties.

*Example 4*

27.5 parts of the compound

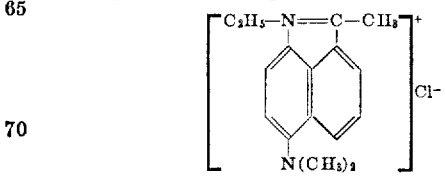

and 25.5 parts of 4-ethoxy-N-methyl-diphenylamide-4'-aldehyde are heated with 150 parts of glacial acetic acid and 12 parts of concentrated hydrochloric acid for 4 hours at 95–100°. The mass is subsequently poured onto 1500 parts of water and 20–30 parts of crystallised sodium acetate are added to the suspension obtained. The dyestuff of the formula

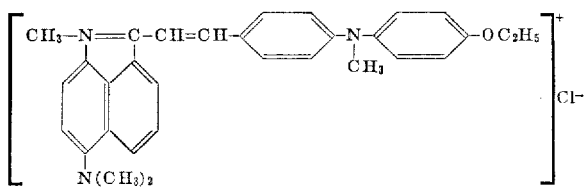

is obtained which dyes polyacrylonitrile in fast green shades.

*Example 5*

24.6 parts of the compound

[CH₃—CH₂CH₂—N═C—CH₃ (naphthalene)]⁺ Br⁻ and 21 parts of 4-amino-3,5-di-isopropyl-benzaldehyde are heated with 200 parts of 90% propionic acid and 5 parts of concentrated sulphuric acid for 3 hours at 100–110°. On diluting with 1500 parts of water the dyestuff of the formula

[CH₃—CH₂CH₂—N═C—CH═CH—(C₆H₂)(CH(CH₃)₂)₂—NH₂ (naphthalene)]⁺ Br⁻ is precipitated, which dyes polyacrylonitrile blue.

*Example 6*

26 parts of the compound

[H₅C₂—N═C—CH₃ (naphthalene-OCH₃)]⁺ Cl⁻ and 21.6 parts of 4-(N-ethyl-N-2'-cyanoethyl)-amino-2-methyl-benzaldehyde are stirred with 500 parts of 1,2-dichloroethane. 15–20 parts of phosphorous oxychloride are added dropwise at 70–80°, the mixture is heated to the boil for 20–30 minutes and the solvent removed under reduced pressure, during which operation the bath temperature should not exceed 110°. The dyestuff of the formula

[H₅C₂—N═C—CH═CH—(C₆H₃)(CH₃)—N(C₂H₅)(CH₂CH₂CN) (naphthalene-OCH₃)]⁺ Cl⁻ is obtained, which dyes polyacrylonitrile is fast blue shades.

*Example 7*

30.2 parts of the compound of the formula

[C₂H₅—N═C—CH₃ (Cl-naphthalene-Cl)]⁺ Cl⁻ and 21.8 parts of 2-(N-phenyl-N-methyl)-aminothiazole-(5)-aldehyde are heated with 250 parts of 95% acetic acid and 10 parts of monochloroacetic acid for 5 hours at 80–90°. After cooling to about 60° the reaction mixture is diluted with 2000 parts of water and the dyestuff precipitated by addition of sodium chloride. It is constituted according to the formula

[C₂H₅—N═C—CH═CH—(thiazole)—N(CH₃)(C₆H₅) (Cl-naphthalene-Cl)]⁺ Cl⁻ and dyes acetate rayon deep-blue.

*Example 8*

26.6 parts of the compound

[H₅C₂—N═C—CH₃ (naphthalene-Cl)]⁺ Cl⁻ and 20 parts of 4-dimethylamino-naphthaldehyde-(1) are heated with 120–150 parts of glacial acetic acid and 15 parts of acetic anhydride for 6 hours at 90–100°. By diluting the solution with 1000–2000 parts of water and salting out, the dyestuff of the formula

[H₅C₂—N═C—CH═CH—(naphthalene)—N(CH₃)₂ (naphthalene-Cl)]⁺ Cl⁻ is obtained which dyes polyacrylonitrile bluish-green.

*Example 9*

28 parts of the compound

[(C₆H₅)—N═C—CH₃ (naphthalene)]⁺ Cl⁻ and 17.7 parts of 4-diethylamino-benzaldehyde are heated with 100 parts of glacial acetic acid and 100 parts of propionic acid for 3 hours at 120–130° After cooling, 2000 parts of water are added and the precipitation of the dyestuff

[(C₆H₅)—N═C—CH═CH—(C₆H₄)—N(C₂H₅)₂ (naphthalene)]⁺ Cl⁻ is completed by addition of a sodium chloride solution. The dyestuff is suitable for the dyeing, printing and colouring in the mass of polyacrylonitrile in very fast bluish-green shades as well as for the production of ball point pen pastes and for the use in rubber printing.

*Example 10*

23.2 parts of the compound

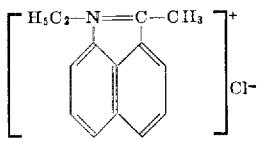

and 25 parts of 2-methyl-4-(2'-chloroethyl-2'-cyanoethyl)-amino-benzaldehyde are heated with 75 parts of glacial acetic acid and 25 parts of acetic anhydride for 6 hours at 95–100°. After cooling to 50–60°, the mass is poured onto 1000 parts of a 5% sodium chloride solution, whereby dyestuff of the formula

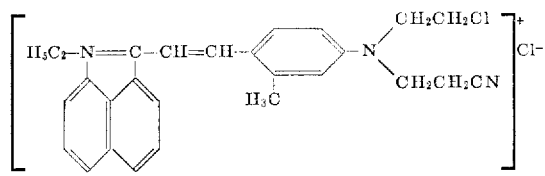

is precipitated. The dyestuff can be purified by recrystallisation from water or from 2–5% acetic acid. It dyes polyacrylonitrile and polyvinylidene cyanide fast blue. If instead of 2-methyl - 4-(2'-chloroethyl - 2' - cyanoethyl)-amino-benzaldehyde the equivalent amount of one of the following aldehydes is used and the same working method applied technically valuable reddish blue to bluish green dyestuffs are obtained which show similar colouristic properties.

2-methyl-4-(N-ethyl-N-2'-cyanoethyl)-amino-benzaldehyde
2-methoxy-4-(N-ethyl-N-2'-cyanoethyl)-amino-benzaldehyde
2-methoxy-4-(N-2'-chloroethyl-N-2'-cyanoethyl)-amino-benzaldehyde
4-(N-cyclohexyl-N-methyl)-amino-benzaldehyde
4-(N-benzyl-N-methyl)-amino-benzaldehyde
4-(N,N-dibenzyl)-amino-benzaldehyde
4-(N-methyl-N-4'-ethoxyphenyl)-amino-benzaldehyde
4-(N-ethyl-N-4'-methoxyphenol)-amino-benzaldehyde
1-methyl-indole-(3)-aldehyde
1,2-dimethyl-indole-(3)-aldehyde
1,2,5-trimethyl-indole-(3)-aldehyde
1-methyl-7-ethyl-indole-(3)-aldehyde
2-methyl-7-ethyl-indole-(3)-aldehyde
2-phenyl-7-ethyl-indole-(3)-aldehyde
1-methyl-2-phenyl-7-ethyl-indole-(3)-aldehyde

*Example 11*

An aqueous dyebath, containing per litre 0.75 g. of 30% acetic acid, 0.4 g. of sodium acetate and 0.2 g. of the dyestuff prepared according to Example 10, is charged at 40–50° with the quantity of polyacrylonitrile fibres corresponding to a goods-to-liquor ratio of 1:40, heated to the boil in the course of about 30 minutes and kept boiling for 30–60 minutes. After the fibres have been rinsed and dried, a brilliant deep blue dyeing with very good fastness properties is obtained.

*Example 12*

A fabric of polyacrylonitrile is printed with a paste of the following composition:

30 parts of the dyestuff prepared according to Example 6,
50 parts of thiodiethylene glycol,
30 parts of cyclohexanol,
30 parts of 30% acetic acid,
500 parts of crystal gum,
30 parts of an aqueous solution of zinc nitrate ($d=1.5$), and
330 parts of water.

The print obtained is dried in the customary manner, steamed for 30 minutes and subsequently rinsed. A clear greenish-blue print with very good fastness properties is obtained.

*Example 13*

22.3 parts of the aldehyde of the formula

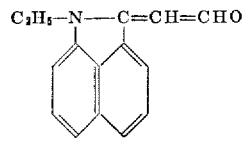

and 14.5 parts of 1,2-dimethylindole are heated together with 125 parts of chlorobenzene and 15 parts of phosphorus oxychloride for 1–2 hours at 80–100° C. The chlorobenzene is then distilled off under reduced pressure or with steam.

The dyestuff of the formula

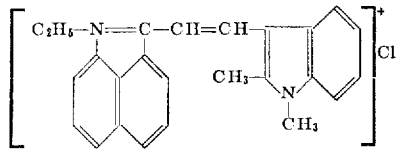

is obtained which dyes polyacrylonitrile fibres deep reddish blue shades with excellent fastness properties.

If instead of 1,2-dimethyl-indole the equivalent amount of one of the following indole derivatives is used and the same working method applied blue dyestuffs with similar colouristic properties are obtained:

1-methyl-2-phenyl-indole
1-methyl-2-phenyl-7-ethyl-indole
2-phenyl-7-ethyl-indole
2-methoxy-indole
2-methyl-indole

*Example 14*

20.9 parts of the aldehyde of the formula

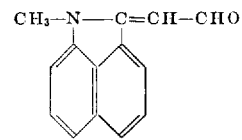

and 18.9 parts of 1,2-dimethyl-5-ethoxy-indole are heated at the boil with 200 parts of chloroform and 10–20 parts of phosphorous oxychloride for ½–1 hour. The chloroform is distilled off and the remaining dyestuff purified by recrystallisation from water. It corresponds to the formula

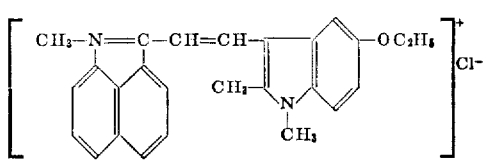

and dyes polyacrylonitrile fast blue shades.

If instead of the above-said aldehyde the equivalent amount of one of the following aldehydes is used and the same working method applied valuable blue dyestuffs are obtained:

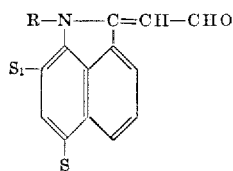

| R | S | S₁ |
|---|---|---|
| Methyl | Chlorine | Hydrogen |
| Methyl | Chlorine | Chlorine |
| Methyl | Bromine | Hydrogen |
| Methyl | Bromine | Bromine |
| Ethyl | Hydrogen | Hydrogen |
| Ethyl | Chlorine | Hydrogen |
| Ethyl | Chlorine | Chlorine |
| Ethyl | Bromine | Hydrogen |
| Ethyl | Bromine | Bromine |
| n-Propyl | Hydrogen | Hydrogen |
| i-Butyl | Hydrogen | Hydrogen |
| Ethyl | Methoxy | Hydrogen |
| Ethyl | Dimethylamino | Hydrogen |

I claim:
1. A methine dyestuff being free of sulphonic acid and carboxylic acid-groups, of the formula

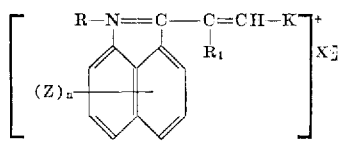

wherein R stands for a member selected from the class consisting of lower alkyl, cyclohexyl, phenyl, naphthyl, and benzyl, Z stands for a member selected from the class consisting of hydrogen, chlorine, bromine, dimethylamino, and methoxy, R₁ stands for a member taken from the class consisting of hydrogen, lower alkyl, and —CN, K stands for a member taken from the class consisting of

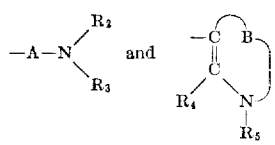

wherein R₂ stands for a member selected from the class consisting of hydrogen, lower alkyl, cyclohexyl, benzyl, phenyl, lower alkyl substituted with chloro, cyano, carbonamido, or hydroxy, phenyl substituted with lower alkoxy, lower alkylamino, or chloro, and lower alkylene linked with the ring A to form a heterocyclic N-containing ring having 5–6 ring members, or when linked with R₃ to form a heterocyclic N-containing ring having 5–6 ring members, R₃ stands for a member selected from the class consisting of hydrogen, lower alkyl, cyclohexyl, benzyl, phenyl, lower alkyl substituted with chloro, cyano, carbonamido, or hydroxy, and phenyl substituted with lower alkoxy, lower alkylamino, or chloro, R₄ stands for a member taken from the class consisting of hyrogen, lower alkyl, phenyl and chloro, R₅ stands for a member selected from a class consisting of hydrogen, lower alkyl, cyano lower alkyl, phenyl, and lower alkoxy phenyl, A represents a member selected from the class consisting of a phenylene, naphthylene, a 5-membered heterocyclic aromatic ring, and phenylene substituted with lower alkyl, lower alkoxy, or chloro, B stands for the residue of a cyclic structure such that the above formula containing B is a 5-membered heterocyclic ring fused to a benzene ring or to a naphthalene ring ; n is an integer ranging from 1 to 2 and X⁻ is an anion used for salt formation in basic dyestuffs.

2. A dyestuffs of the formula

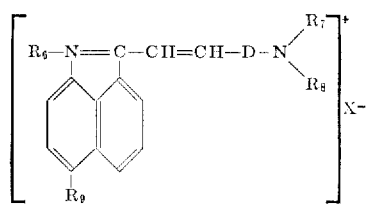

wherein R₆ stands for lower alkyl, R₉ stands for a member selected from the class consisting of hydrogen and bromine, D represents a member selected from the class consisting of p-phenylene, lower alkyl substituted p-phenylene and lower alkoxy substituted p-phenylene, R₇ stands for a member selected from the class consisting of lower alkyl and chloro substituted lower alkyl, R₈ stands for a member taken from the class consisting of lower alkyl and cyano substituted lower alkyl, and X⁻ stands for an anion used for salt formation in basic dyestuffs.

3. A dyestuff of the formula

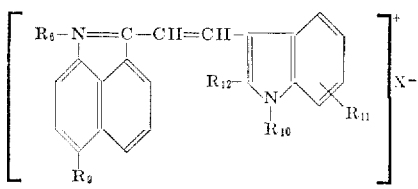

wherein R₆ stands for lower alkyl, R₉ stands for a member selected from the class consisting of hydrogen and bromine, R₁₀ stands for a member selected from the class consisting of hydrogen and lower alkyl, R₁₁ stands for a member taken from the class consisting of hydrogen and lower alkyl, R₁₂ stands for phenyl, and X⁻ stands for an anion used for salt formation in basic dyestuffs.

4. A dyestuff of claim 1 wherein R stands for lower alkyl having 1 to 2 carbon atoms.
5. A dyestuff of claim 1 wherein R₁ stands for hydrogen.
6. A dyestuff of claim 1 wherein Z stands for hydrogen.
7. A dyestuff of claim 1 wherein Z stands for Br⁻.
8. A dyestuff of claim 2 wherein R₆ stands for CH₃.
9. A dyestuff of claim 2 wherein R₆ stands for C₂H₅.
10. A dyestuff of claim 3 wherein R₆ stands for CH₃.
11. A dyestuff of claim 3 wherein R₆ stands for C₂H₅.
12. The dyestuff of the formula

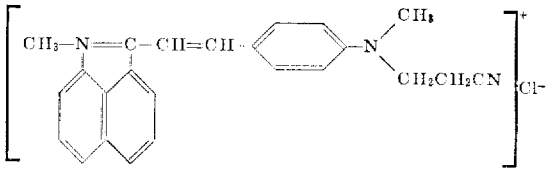

13. The dyestuff of the formula

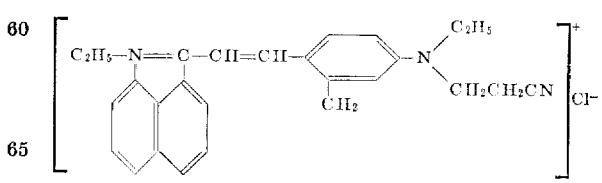

14. The dyestuff of the formula

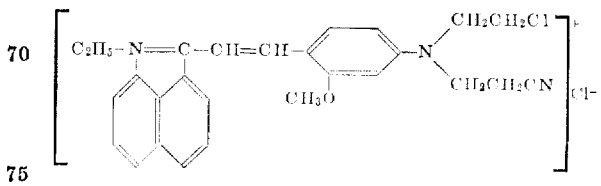

15. The dyestuff of the formula

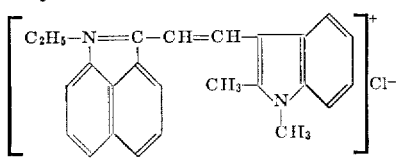

16. The dyestuff of the formula

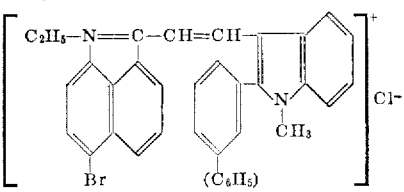

17. The dyestuff of the formula

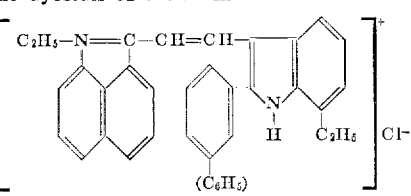

18. The dyestuff of the formula

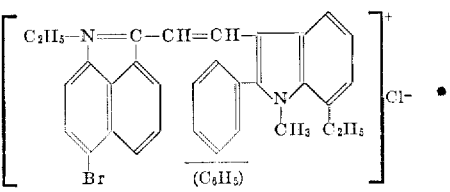

References Cited

Chemical Abstracts I, vol. 35, col. 4024 to 4025 (1941) (abstracts of Knunyants et al.).
Chemical Abstracts II, vol. 54, col. 10,993 (1960) (abstracts of Dokunikhin, et al.).
Chemical abstracts III, vol. 54, col. 24,795 (1960) (abstracts of Dokunikhin, et al.).
Ficken et al., J. Chem. Soc., 1960, pages 1537 to 1541.

JOHN D. RANDOLPH, *Primary Examiner.*

UNITED STATES PATENT OFFICE
CERTIFICATE OF CORRECTION

Patent No. 3,362,953                              January 9, 1968

Alfred Brack

It is hereby certified that error appears in the above numbered patent requiring correction and that the said Letters Patent should read as corrected below.

Column 2, line 2, "cycloakyl" should read -- cycloalkyl --; line 37, "Vil-" should read -- Vils --. Column 3, line 39, "piperindine" should read -- piperidine --. Column 4, line 46, "NO$_2$" should read -- NO$_3$- --. Column 5, line 34, "3-methy-" should read -- 3-methyl- --. Column 6, line 47, "polycinyliden should read -- polyvinylidene --; line 73, "diphenylamide" should read -- diphenylamine --. Column 7, line 74, "is fast blue" should read -- in fast blue --. Column 9, line 48, "methoxyphenol" should read -- methoxyphenyl --. Column 10, lines 26 to 34, the right-hand portion of the formula reading

           should  read           

Column 11, line 55, before "linked" insert -- when --; line 64 "phenyl and chloro" should read -- and phenyl --; line 65, "a" should read -- the --. Column 12, line 1, "A dyestuffs" should read -- A dyestuff --; lines 59 to 66, the right-hand portion of the formula reading

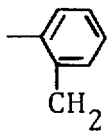           should read           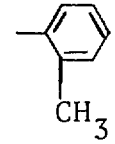

Column 13, lines 10 to 17, the formula should appear as shown below:

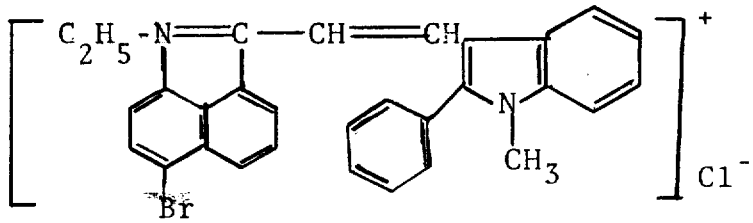

lines 19 to 26, the formula should appear as shown below:

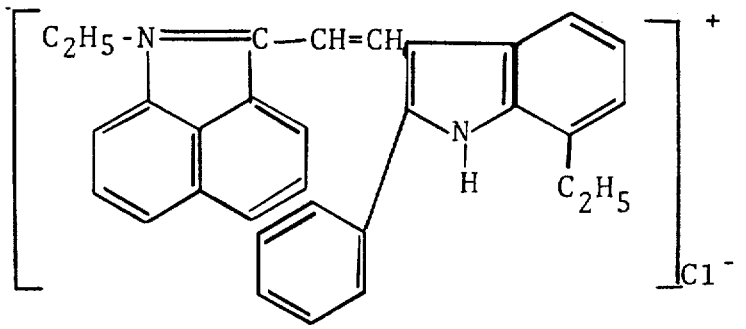

Column 14, lines 4 to 12, the formula should appear as shown below:

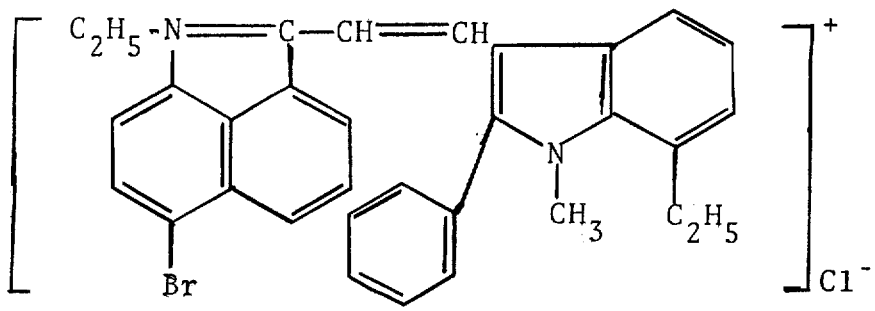

Signed and sealed this 29th day of July 1969.

(SEAL)
Attest:

EDWARD M. FLETCHER, JR.
Attesting Officer

WILLIAM E. SCHUYLER, JR.
Commissioner of Patents